Figure 4:
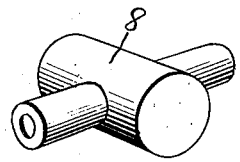

L. GADDIE.
YIELDABLE GEARING.
APPLICATION FILED JUNE 3, 1911.
1,005,191.
Patented Oct. 10, 1911.
2 SHEETS—SHEET 1.
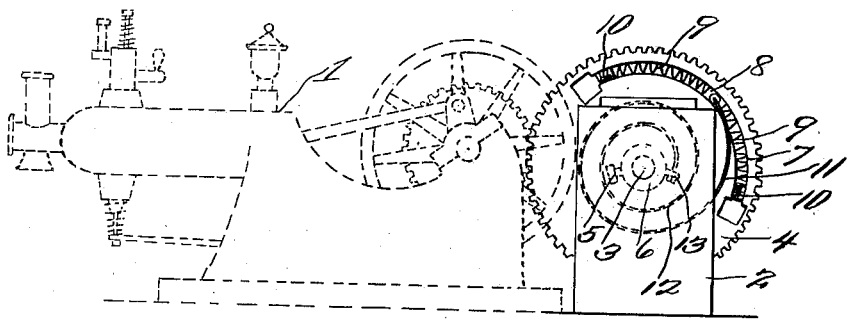
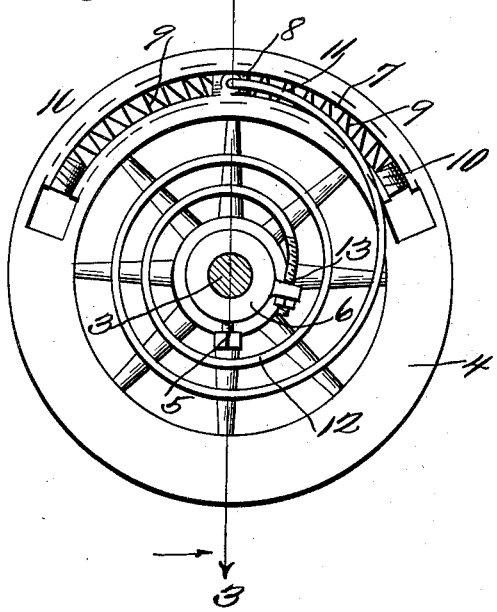
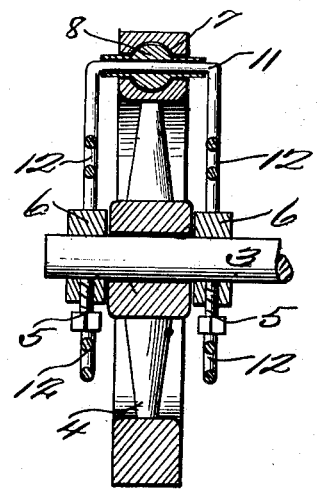
Witnesses
Francis T. Boswell
R. Cot
Inventor
Lee Gaddie,
By D. Swift &C.
Attorney

L. GADDIE.
YIELDABLE GEARING.
APPLICATION FILED JUNE 3, 1911.

1,005,191.

Patented Oct. 10, 1911.

2 SHEETS—SHEET 2.

Witnesses
Francis G. Boswell,
R. Cox

Inventor
Lee Gaddie
By D. Swift
Attorney

UNITED STATES PATENT OFFICE.

LEE GADDIE, OF WELLINGTON, KANSAS.

YIELDABLE GEARING.

1,005,191.     Specification of Letters Patent.     Patented Oct. 10, 1911.

Application filed June 3, 1911. Serial No. 631,194.

*To all whom it may concern:*

Be it known that I, LEE GADDIE, a citizen of the United States, residing at Wellington, in the county of Sumner and State of Kansas, have invented a new and useful Yieldable Gearing; and I do hereby declare the following to be a full, clear, and exact description of the invention, such as will enable others skilled in the art to which it appertains to make and use the same.

This invention relates to a new and useful power transmitting wheel or pulley, adapted mainly for use between cream separators and the like and gasolene engines or similar power generators.

The invention in its broadest scope aims as its primary object, to provide a resilient connection between the wheel or pulley or gear and the shaft, so as to absorb the mechanical shocks and vibrations, incident to the working of the gasolene engine or other machinery, in connection with the pulley or wheel.

In the drawings there are disclosed certain features of construction, but in practical fields these features may necessitate alterations, to which the applicant is entitled, provided the alterations are comprehended within the scope of what is claimed.

The invention comprises further features and combinations of parts, as hereinafter set forth, shown in the drawings, and claimed.

Figure 5:
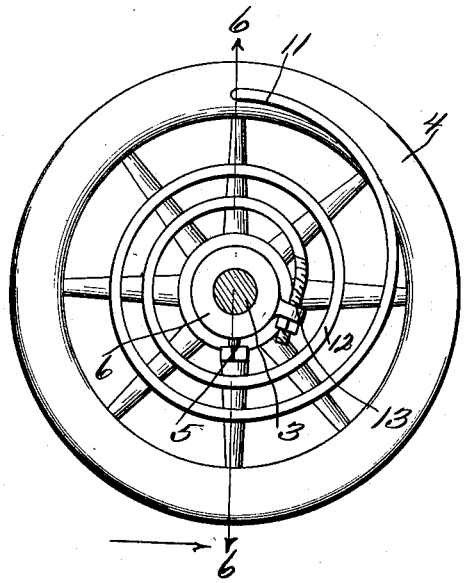
Figure 6:
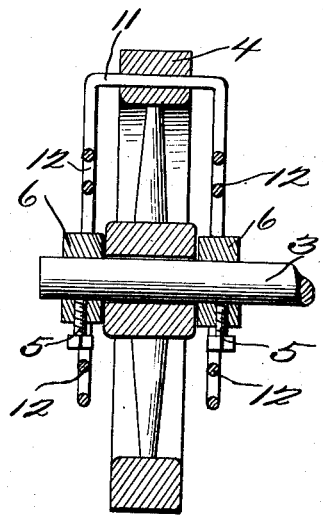

In the drawings:—Figure 1 is a view in elevation, showing the application of the pulley between the gasolene engine and cream separator. Fig. 2 is an enlarged elevation of the wheel or pulley detached from the engine and cream separator. Fig. 3 is a transverse sectional view on line 3—3 of Fig. 2. Fig. 4 is a detail view of a cross head block carried by the pulley or wheel. Fig. 5 is a view in elevation of a modified form of pulley or wheel. Fig. 6 is a sectional view on line 6—6 of Fig. 5.

Referring more especially to the drawings 1 designates the engine (which is shown in dotted lines) while 2 denotes the cream separator. Loosely journaled upon the shaft 3 of the cream separator is a gear wheel 4, but in Figs. 2, 3 and 4 the wheel 4 is shown as a pulley wheel. Made fast to the shaft 3, by means of the set screws 5 are the collars 6, one being arranged upon each side of the wheel 4.

In Figs. 1 to 4 inclusive, the wheel 4 is provided with a slot 7, in which a cross head block 8 is slidably arranged. Also arranged in the slot between the ends of the cross head block, and the ends of the slot are springs 9, which hold the cross head block yieldably or resiliently centered in the slot. The tension of the springs 9 may be regulated by the devices 10.

Passing through the cross head block is a one piece spring member 11. On each side of the wheel 4 this spring member 11 is turned into helical springs 12, the ends of which are anchored to the collars 6, as shown at 13.

In Figs. 5 and 6, the spring member passes through the wheel 4, and the slot 7 is dispensed with.

From the foregoing it will be apparent, that any sudden or irregular movement of the driving shaft of the gasolene engine (which as a rule vibrates considerably incident to the explosion of the charges) will be absorbed or compensated by the buffer spring 9, thereby transmitting power to the cream separator in a smooth uninterrupted or regular manner.

The invention having been set forth, what is claimed as new and useful is:—

1. In combination, a shaft, a wheel loosely journaled thereon, collars fixed to the shaft, one upon each side of the wheel, and a one piece spring member connected between the collars and the wheel, said spring member penetrating the wheel near its periphery and turned into helical springs on each side of the wheel.

2. In combination, a shaft, a wheel loosely journaled thereon, collars fixed to the shaft, one upon each side of the wheel, and helical springs arranged on either side of the wheel and connected to the collars, the springs having resilient connections with the wheel.

3. In combination, a shaft, a wheel loosely journaled thereon, collars fixed to the shaft, one upon each side of the wheel, and helical springs arranged on each side of the wheel and connected to the collars, the wheel having a semi-annularly arranged slot adjacent the periphery, a member slidably arranged in the slot, resilient means located between the member and the ends of the slot, the helical springs having connections with the member.

In testimony whereof I have signed my name to this specification in the presence of two subscribing witnesses.

LEE GADDIE.

Witnesses:
 E. W. SPEAR,
 L. L. WHITTEN.